Sept. 13, 1955 U. RANZI 2,717,678
CLUTCH
Filed Aug. 14, 1950
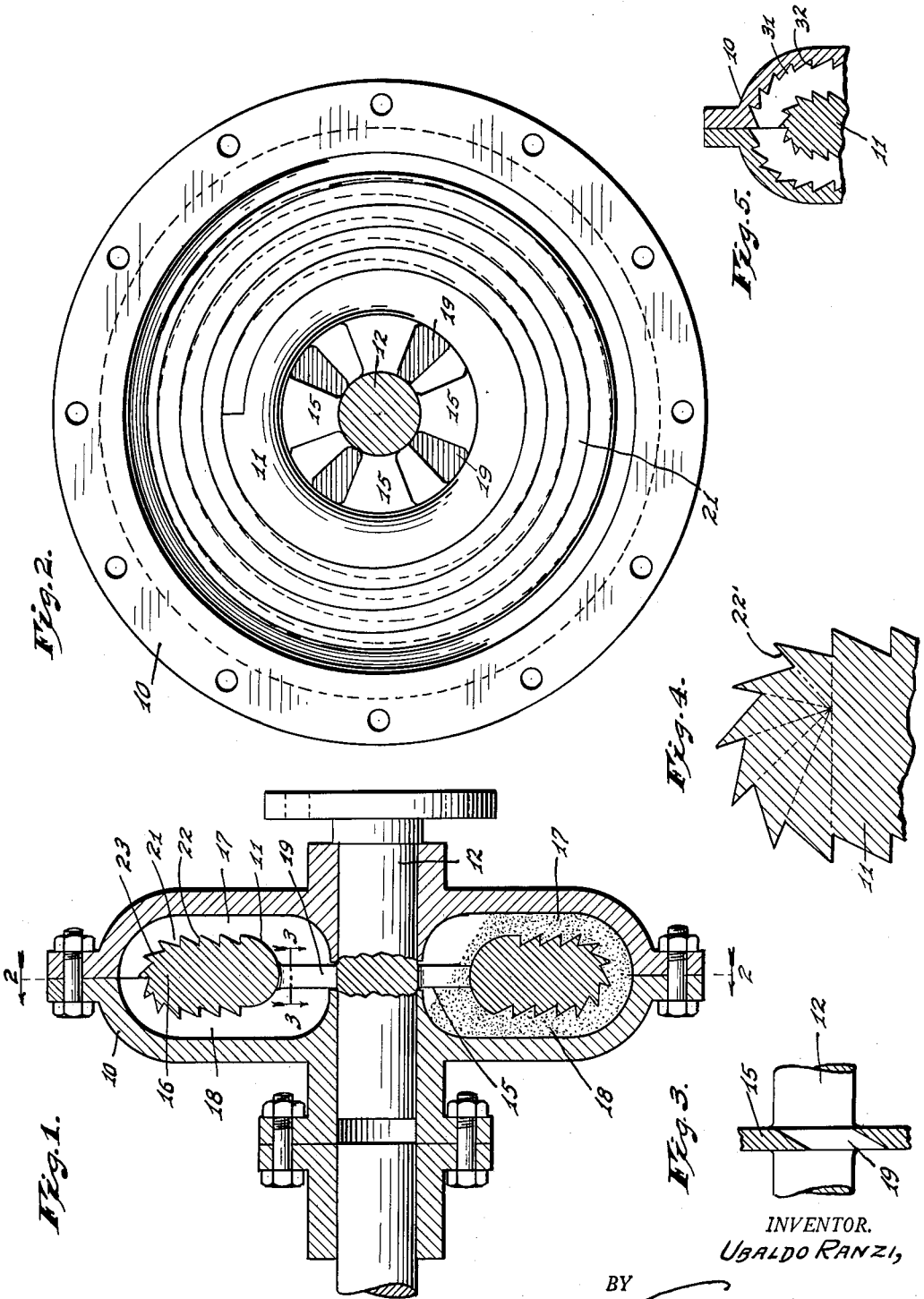
INVENTOR.
UBALDO RANZI,
BY
ATTORNEYS.

United States Patent Office 2,717,678
Patented Sept. 13, 1955

2,717,678

CLUTCH

Ubaldo Ranzi, Legnano, Italy

Application August 14, 1950, Serial No. 179,173

11 Claims. (Cl. 192—58)

This invention relates to torque transmitting couplings of the powder type. Such couplings, which have heretofore been known, include a supply of granular material confined in a space or spaces jointly defined by relatively rotatable driving and driven members, the torque being transmitted by friction from the driving member to the driven member through the granular material. When a powder clutch slips, heat is generated at the point of slippage, and the temperature of the adjacent granular material undergoes an increase which, coupled with the effects of pressure resulting from centrifugal force, may so affect the granular material as to interfere with its desired torque-transmitting function.

To reduce the extent of temperature rises and the adverse effects thereof, it has heretofore been proposed to so form the clutch members as to provide a circulatory path for the granular material and to equip one or both clutch members with means which will cause circulation of the granular material over such path when the two clutch members rotate relatively to each other. My copending United States application Serial No. 746,458, filed May 7, 1947, shows several such arrangements, in all the specific forms of which the powder-circulating means acts to urge the powder radially outwardly toward the periphery of a rotating casing and to create thereat a pressure sufficient to force the powder radially inwardly through a passage forming part of the circulatory path.

The present invention aims at improving devices of the type shown in the aforesaid application to the end that circulation of the granular material will be facilitated, thus further reducing the possibility of undesirable temperature rises and promoting smooth and predictable operation of the clutch.

In its more important aspects, my invention is characterized in that the powder-circulating means includes means which act in direct opposition to centrifugal force on powder moving inwardly over the circulatory path. In the preferred form of the invention, the circulatory path is defined substantially entirely by spaced, opposed faces of the driving and driven members. The powder-circulating means may be located on the driving member, or the driven member, or on both, and conveniently take the form of spirally extending grooves or ribs having powder-propelling faces which are generally normal to the direction of powder circulation and other faces oblique in such direction. The powder-circulating means acting on inwardly moving powder may be, and desirably are, supplemented by other powder-moving means located at another point or points along the circulatory path.

The accompanying drawing illustrates the invention: Fig. 1 is an axial section through a powder clutch; Fig. 2 is a transverse section on the line 2—2 of Fig. 1; Fig. 3 is a fragmental tangential section on the line 3—3 of Fig. 1; and Fig. 4 is a fragmental view similar to Fig. 1 illustrating a modified form of powder-circulating groove; and Fig. 5 is a fragmental view similar to Fig. 1 illustrating a coupling in which both members are provided with powder-circulating grooves.

The device illustrated in the drawing comprises a driving member in the form of a hollow housing 10 and a disk-like driven member 11 mounted within and rotatable relatively to such housing. As shown, the driven element 11 is rigidly mounted on a driven shaft 12 which is journaled in the casing 10 to hold the driving and driven members positively in accurate alignment; but such accurate alignment is not an essential.

The driven member 11 comprises a central web 15 and a thickened rim 16 having axially presented faces of considerable radial extent. The rim 16 and the inner surface of the casing 10 are spaced apart to provide a powder-receiving space having a first radially extending region 17 located at one side of the thickened disk-rim 16 and a second radially extending region 18 located on the opposite side of the thickened disk rim. At their outer edges, the two regions 17 and 18 communicate with each other over the periphery of the thickened disk-rim 16, while at their inner edges they communicate with each other through one or more openings 19 in the web 15.

In the specific coupling shown in the drawing, the powder-moving element is in the form of a groove 21 which beginning near the inner edge of the region 17, progresses spirally outward on the face of the disk-rim, over the periphery of the disk-rim, and thence spirally inwardly to a point near the inner edge of the region 18.

A supply of appropriate granular material, such as graphite, talc, or powdered metal, is placed in the space between the driving and driven elements before the two parts of the housing 10 are secured together. Assuming that with the powder in place the housing 10 is placed in rotation while the disk 11 remains at rest, the powdered material will tend to rotate with the housing and to distribute itself around the inner surface of the housing under the influence of centrifugal force. As the housing rotates, however, the groove 21 will act to cause a circulation of the powder outward in the region 17, over the periphery of the disk, inwardly to the region 18, and through the openings 19 to the inner edge of the region 17. Both centrifugal force and the forces necessary to cause powder-circulation around the thickened rim of the disk cause an increase in the pressure to which the powder is subjected, thus increasing the pressure and friction between the powder and the clutch elements as well as within the body of the powder itself. The pressure and friction thus generated oppose movement of the powder relative both to the casing and to the disk, with the result that a torque is transmitted through the powder from the casing to the disk. As the speed of rotation of the casing 10 increases, the rate of circulation of the powder increases, as do also the pressure and friction, and the torque applied to the driven member 11 eventually becomes great enough to cause that driven member to begin rotation. As long as there is relative rotation between the driving and driven elements, the powder continues to circulate, and the resultant agitation of the powder promotes dissipation of the heat generated by slippage and thus tends to prevent objectionable changes in the character and action of the powder.

The groove 21 conveniently has in cross-section a generally triangular shape defined by a powder-propelling face 22 disposed generally normal to the direction of powder circulation and by a second face 23 which extends obliquely outwardly in the direction of powder circulation from the base or inner edge of the face 22. Desirably, the outer edge of each oblique face 23 substantially coincides with the outer edge of the face 22 of the next groove-turn; as in such an arrangement the width of the groove 21 has a maximum value.

It is obvious that slippage within the body of the granular material contained in the casing 10 will interfere with the desired circulation of such material around the disk-rim 16. If for example, slippage should occur at the surface constituting the envelope of the outer groove-edges, the granular material within the groove could rotate with the driven member 11 while the remainder of the granular material rotated with the driving casing 10, and no circulation of the granular material would result. To decrease the possibility of slippage within the granular material at the open side of the groove 21, it is desirable that the ratio of the co-efficient of friction within the powder to the co-efficient of friction between the powder and the material of the disk be greater than the ratio of the sum of the widths of the two groove sides 22 and 23 to the width of the groove-opening. The co-efficient of friction within the powder can be determined by the angle of repose of the powder, while that between the powder and the metal of the driven member can be readily determined by noting the minimum slope at which the powder will descend an inclined surface of the disk-metal under the influence of gravity.

In Fig. 1 of the drawing, the powder-propelling groove-face 22 is shown as extending normally to the surface constituting the envelope of the outer edges of the groove sides, such normality continuing both along the sides and over the periphery of the disk-rim 16. It may be desirable in some instances to impart to that portion of the groove extending over the periphery of the disk rim the shape illustrated in Fig. 4. As there shown, the powder-propelling groove faces 22', instead of being substantially normal to the aforesaid envelope-surface, slopes outwardly and forwardly with respect to the direction of powder circulation. This groove-shape tends to decrease the maximum pressure to which the powdered material is subjected in the course of its circulation.

In the construction as so far described circulation of the powder results entirely from the presence of the groove 21 in the face of the driven member 11. If it should be desired to obtain a more vigorous circulation of the powder, the inner face of the casing 10 may be provided with a groove 31 having a powder-propelling face 32 generally normal to the direction of powder circulation. As the relative rotation between the powder and the driving member will be in the opposite direction from relative rotation between the powder and the driven member, any groove 31 provided in the casing will have a spiral inclination opposite to that of the groove 21 in the driven member.

In most instances, it will be of advantage to employ powder-propelling provisions throughout substantially the entire extent of the path over which the powder circulates; and for that reason the openings 19 may have a helical inclination. However, if a less vigorous powder-circulation is desired, powder-propelling provisions may be eliminated from portions of the disk. For example, the spiral grooving may be eliminated over the extreme peripheral portion of the disk and employed only on the disk-sides.

I claim as my invention:

1. In a centrifugal coupling of the powder type, relatively rotatable driving and driven elements, said driving element comprising a hollow housing and said driven element comprising a rotor within said housing, said rotor being spaced from the inner surface of the housing to provide a powder-receiving space, and being provided near its center with one or more openings through which powder may pass from one side of the rotor to the other, a supply of power within said housing; and means operative on relative rotation of said members to cause circulation of said powder outwardly along one face of the rotor, over the periphery of the rotor, inwardly along the other face of the rotor, and thence through said openings, said means comprising a spiral groove on that face of the rotor along which the powder moves inwardly.

2. In a centrifugal coupling of the powder type, relatively rotatable driving and driven elements, said driving element comprising a hollow housing and said driven element comprising a rotor within said housing, said rotor being spaced from the inner surface of the housing to provide a powder-receiving space and being provided near its center with one or more openings through which powder may pass from one side of the rotor to the other, a supply of powder within said housing; and means operative on relative rotation of said members to cause circulation of said powder outwardly along one face of the rotor, over the periphery of the rotor, inwardly along the other face of the rotor, and thence through said openings, said means comprising a continuous groove which proceeds spirally outwardly on one face of the rotor, over the periphery of the rotor, and spirally inwardly on the other face of the rotor, the portion of such groove occupying the one face of the rotor being of opposite hand from the groove-portion occupying the other rotor-face.

3. In a centrifugal coupling of the powder type, relatively rotatable driving and driven elements, said driving element comprising a hollow housing and said driven element comprising a rotor within said housing, said rotor being spaced from the inner surface of the housing to provide a powder-receiving space, and being provided near its center with one or more openings through which powder may pass from one side of the rotor to the other, a supply of powder within said housing; the opposite faces of said rotor being spirally grooved with grooves which are of opposite hand on such opposite rotor-faces, whereby on relative rotation of said two members said grooves will cause the powder to circulate outwardly along one face of the rotor, over the periphery of the rotor, inwardly along the other face of the rotor, and thence through said openings.

4. The invention set forth in claim 1 with the addition that said means also includes a spirally extending groove on the inner surface of said housing.

5. In a centrifugal coupling of the powder type; relatively rotatable driving and driven members constructed and arranged to provide for powder contained in the coupling, a circulatory path including a portion having radial extent and defined by spaced, opposed faces of said two members, a supply of powder in said path, one of said members being provided in said path-portion with a spirally extending groove operative on relative rotation of the two members to cause inward movement of powder in said path portion.

6. The invention set forth in claim 5 with the addition that said driving member is a hollow housing and said driven member a rotor within said housing, said circulatory path being provided by a space between the inner housing surface and the side and peripheral surfaces of said rotor and by one or more openings extending through the rotor, said groove being in a side face of the rotor.

7. The invention set forth in claim 5 with the addition that said driving member is a hollow housing and said driven member a rotor within said housing, said circulatory path being provided by a space between the inner housing surface and the side and peripheral surfaces of said rotor and by one or more openings extending through the rotor.

8. The invention set forth in claim 5 with the addition that said driving member is a hollow housing and said driven member a rotor within said housing, said circulatory path being provided by a space between the inner housing surface and the side and peripheral surfaces of said rotor and by one or more openings extending through the rotor, said opening or openings extending helically in the direction of powder movement.

9. In a centrifugal coupling of the powder type; relatively rotatable driving and driven members constructed and arranged to provide for powder contained in the coupling, a circulatory path including a portion having radial extent and defined by spaced, opposed faces of said two members, a supply of powder in said path, one of said members being provided with a spirally extending groove operative on relative rotation of the two members to cause circulation of the powder over such path, said groove having side faces inclined at different angles to the direction of movement of the adjacent powder, one of said side faces being a powder-propelling face and being more nearly normal to such direction than is the other face.

10. In a centrifugal coupling of the powder type; relatively rotatable driving and driven members constructed and arranged to provide for powder contained in the coupling, a circulatory path including a portion having radial extent and defined by spaced, opposed faces of said two members, a supply of powder in said path, one of said members being provided with a spirally extending groove operative on relative rotation of the two members to cause circulation of the powder over such path, said groove having side faces inclined at different angles to the direction of movement of the adjacent powder, one of said side faces being a powder-propelling face and being substantially normal to such direction.

11. The invention set forth in claim 9 with the addition that said powder propelling face extends outwardly of the grooved member toward the circulatory path and forwardly in the direction of powder circulation.

References Cited in the file of this patent

UNITED STATES PATENTS

| 1,887,610 | Widgren et al. | Nov. 15, 1932 |

FOREIGN PATENTS

| 74,036 | Norway | Oct. 4, 1948 |
| 673,047 | Great Britain | 1952 |
| 920,562 | France | Apr. 11, 1947 |